US008351369B2

(12) United States Patent
Han et al.

(10) Patent No.: US 8,351,369 B2
(45) Date of Patent: *Jan. 8, 2013

(54) APPARATUS AND METHOD FOR ADAPTIVE DATA PACKET SCHEDULING IN MESH NETWORKS

(75) Inventors: Seokman Paul Han, Rancho Cordova, CA (US); Raju Pandey, Davis, CA (US)

(73) Assignee: SynapSense Corporation, Folsom, CA (US)

( * ) Notice: Subject to any disclaimer, the term of this patent is extended or adjusted under 35 U.S.C. 154(b) by 792 days.

This patent is subject to a terminal disclaimer.

(21) Appl. No.: 12/001,884

(22) Filed: Dec. 12, 2007

(65) Prior Publication Data

US 2009/0154481 A1    Jun. 18, 2009

(51) Int. Cl.
*H04B 7/212* (2006.01)
(52) U.S. Cl. .................. 370/322; 370/458; 455/455
(58) Field of Classification Search .............. 370/458, 370/459, 436, 461, 473, 469
See application file for complete search history.

(56) References Cited

U.S. PATENT DOCUMENTS

| | | | | |
|---|---|---|---|---|
| 5,012,469 A | * | 4/1991 | Sardana | 370/322 |
| 5,379,290 A | | 1/1995 | Kleijne | |
| 5,515,369 A | | 5/1996 | Flammer, III | |
| 5,896,412 A | | 4/1999 | Levanon | |
| 6,094,425 A | * | 7/2000 | Auger et al. | 370/330 |
| 6,208,247 B1 | | 3/2001 | Agre | |
| 6,404,756 B1 | * | 6/2002 | Whitehill et al. | 370/338 |
| 6,442,596 B1 | | 8/2002 | Dyer | |
| 6,480,497 B1 | | 11/2002 | Flammer, III | |
| 6,590,928 B1 | | 7/2003 | Haartsen | |
| 6,735,630 B1 | | 5/2004 | Gelvin | |
| 6,807,165 B2 | * | 10/2004 | Belcea | 370/347 |
| 6,850,502 B1 | | 2/2005 | Kagan | |
| 6,856,591 B1 | | 2/2005 | Ma et al. | |
| 6,859,831 B1 | | 2/2005 | Gelvin | |
| 7,010,392 B2 | | 3/2006 | Bash | |
| 7,020,701 B1 | | 3/2006 | Gelvin | |

(Continued)

FOREIGN PATENT DOCUMENTS

CA    2616715    2/2007

(Continued)

OTHER PUBLICATIONS

Kanzaki, Akimitsu et al.; Dynamic TDMA Slot Assignments in Ad Hoc Networks; 17th Int'l Conference on Advanced Information Networking and Applications; Mar. 2003; pp. 330-335.

(Continued)

*Primary Examiner* — Kevin C Harper
*Assistant Examiner* — Henry Baron
(74) *Attorney, Agent, or Firm* — Salter IP Law; Jim H. Salter (57) ABSTRACT

Various embodiments provide an apparatus and method for adaptive data packet scheduling in a mesh network. An example embodiment is configured to divide a time period into a plurality of frames; subdivide each of the plurality of frames into a plurality of slots, each of the plurality of slots providing a time segment for local data communication between nodes in a mesh network; enable a first node to dynamically assign itself a first slot of the plurality of slots for local data communication, the first node using the first slot to receive data communications destined for the first node; and communicate to other nodes of the mesh network information indicative of the first node's dynamic assignment of the first slot.

22 Claims, 4 Drawing Sheets

U.S. PATENT DOCUMENTS

| | | | |
|---|---|---|---|
| 7,031,329 B2 | 4/2006 | Lipsanen | |
| 7,031,870 B2 | 4/2006 | Sharma | |
| 7,086,603 B2 | 8/2006 | Bash | |
| 7,113,519 B2 * | 9/2006 | Hammel et al. | 370/458 |
| 7,176,808 B1 | 2/2007 | Broad | |
| 7,180,915 B2 | 2/2007 | Beyer | |
| 7,272,129 B2 | 9/2007 | Calcev | |
| 7,463,644 B2 | 12/2008 | Zhu | |
| 7,502,360 B2 * | 3/2009 | Liu et al. | 370/348 |
| 7,680,092 B2 | 3/2010 | Van Laningham | |
| 2002/0073152 A1 | 6/2002 | Andrew | |
| 2003/0067892 A1 | 4/2003 | Beyer | |
| 2005/0024826 A1 | 2/2005 | Bash | |
| 2005/0030968 A1 * | 2/2005 | Rich et al. | 370/449 |
| 2005/0074025 A1 * | 4/2005 | Shao et al. | 370/461 |
| 2005/0129051 A1 | 6/2005 | Zhu | |
| 2005/0173549 A1 | 8/2005 | Bash | |
| 2005/0201340 A1 | 9/2005 | Wang | |
| 2005/0213612 A1 | 9/2005 | Pister | |
| 2005/0239411 A1 | 10/2005 | Hazra | |
| 2006/0029060 A1 | 2/2006 | Pister | |
| 2006/0029061 A1 | 2/2006 | Pister | |
| 2006/0034191 A1 * | 2/2006 | Sahinoglu et al. | 370/254 |
| 2006/0126501 A1 | 6/2006 | Ramaswamy | |
| 2006/0149408 A1 | 7/2006 | Speetzer | |
| 2006/0161909 A1 | 7/2006 | Pandey | |
| 2006/0198346 A1 | 9/2006 | Liu | |
| 2006/0215581 A1 | 9/2006 | Castagnoli | |
| 2006/0215583 A1 | 9/2006 | Castagnoli | |
| 2006/0225446 A1 | 10/2006 | Bash | |
| 2006/0268791 A1 | 11/2006 | Cheng | |
| 2006/0269028 A1 | 11/2006 | Bley | |
| 2007/0050523 A1 | 3/2007 | Emeott | |
| 2007/0116060 A1 | 5/2007 | Qu | |
| 2007/0208992 A1 | 9/2007 | Koren | |
| 2007/0211686 A1 | 9/2007 | Belcea | |
| 2007/0258508 A1 | 11/2007 | Werb | |
| 2008/0008138 A1 * | 1/2008 | Pun | 370/338 |
| 2008/0019265 A1 | 1/2008 | Alluisi et al. | |
| 2008/0019302 A1 | 1/2008 | Nagarajan et al. | |
| 2008/0043707 A1 | 2/2008 | Ren | |
| 2008/0095222 A1 | 4/2008 | Van Laningham | |
| 2008/0151801 A1 | 6/2008 | Mizuta | |
| 2008/0269932 A1 | 10/2008 | Chardon | |
| 2008/0298450 A1 | 12/2008 | Zhang et al. | |
| 2009/0109992 A1 * | 4/2009 | Lurie et al. | 370/445 |

FOREIGN PATENT DOCUMENTS

| | | |
|---|---|---|
| CN | 101401480 | 4/2009 |
| DE | 202006019810 | 5/2007 |
| EP | 1719301 | 11/2006 |
| EP | 1911184 | 4/2009 |
| JP | 2004-336779 | 11/2004 |
| JP | 2006-311549 | 11/2006 |
| JP | 2009504010 | 1/2009 |
| KR | 10-0646748 | 11/2006 |
| KR | 10-2007-0009390 | 1/2007 |
| KR | 10-2007-0105731 | 10/2007 |
| WO | WO2005083953 | 9/2005 |
| WO | WO2007015962 | 6/2007 |
| WO | WO2008021278 | 7/2008 |

OTHER PUBLICATIONS

Lee, Myung J. et al.; Emerging Standards for Wireless Mesh Technology; IEEE Wireless Communications; Apr. 2006; vol. 13; pp. 56-63.

Wei Li et al.; Dynamic TDMA Slot Assignment Protocol for Multihop Ad Hoc Networks; Int'l Conference on Communication Technology; Nov. 2006; pp. 1-4.

* cited by examiner

APPARATUS AND METHOD FOR ADAPTIVE DATA PACKET SCHEDULING IN MESH NETWORKS

TECHNICAL FIELD

The disclosed subject matter relates to the field of network communications, and more particularly to data communications in mesh networks.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2007 SynapSense Corporation, All Rights Reserved.

BACKGROUND

Mesh networking is a way to route data and instructions between nodes. A node can be any device connected to a computer network. Nodes can be computers, routers, or various other networked devices. On a TCP/IP network, a node is any device with an Internet Protocol (IP) address. Mesh networking allows for continuous connections and reconfiguration around broken or blocked paths by "hopping" from node to node until the destination is reached. Mesh networks differ from other networks in that the component parts can all connect to each other via multiple hops, and they generally are not mobile devices. In a packet-switching network, a hop is the trip a data packet takes from one router or intermediate node in a network to another node in the network. On the Internet (or a network that uses TCP/IP), the number of hops a packet has taken toward its destination (called the "hop count") is kept in the packet header.

Wireless mesh networks employ intelligent nodes typically including a wireless (e.g. radio) transmitter and receiver, a power source, input devices, sometimes output devices, and an intelligent controller, such as a programmable microprocessor controller with memory. In the past, wireless mesh networks have been developed having configurations or networks for communication that are static, dynamic or a hybrid of static and dynamic. Power for these networks has been supplied either via wires (the nodes are "plugged in") or from batteries in each node. As the size, power, and cost of the computation and communication requirements of these devices has decreased over time, battery-powered wireless nodes have gotten smaller; yet, the computing demands on the wireless nodes have increased.

Wireless mesh network technology can be used for deploying sensors as nodes in a variety of different environments for monitoring diverse parameters such as, for example, temperature, pressure, and humidity. These types of networks can be denoted wireless sensor networks (WSN). Each sensor in a WSN is typically powered by a battery and therefore has a limited energy supply and operational capability. Because the sensors are constantly monitoring the environment and communicating with other nodes, it is important to efficiently manage the power consumed by each sensor. Further, it is important to monitor the operational status of each of the sensors.

Given that most WSN devices are battery powered, the overall network lifetime depends on the efficiency with which sensing, computing, and data transmission by the sensors can be achieved. Because the power requirements for wireless communication by the sensors are orders of magnitude higher than the other sensor operations, it is critical that operation of the radios on these devices be managed carefully. This is primarily achieved by turning the radio on only when devices need to send and/or receive data. The operational lifetime of the network, thus, depends on the ability to identify and schedule wakeup and sleep times for the radios in the wireless network nodes.

Time division multiple access (TDMA) is a well-known channel access method for shared medium (usually radio) networks. TDMA allows several users to share the same frequency channel by dividing the signal into different timeslots. The users transmit in rapid succession, one after the other, each using his/her own timeslot. This allows multiple stations to share the same transmission medium (e.g. radio frequency channel) while using only the part of the available bandwidth. The timeslot definition and allocation in TDMA, however is usually determined globally for all nodes. It is therefore harder to modify the timeslot definition and allocation in TDMA if the network configuration or communication requirements change.

In CSMA/CA (Carrier Sense Multiple Access With Collision Avoidance), a station that wants to transmit a packet first listens to the shared channel for a predetermined amount of time to determine if the channel is busy or not. If the channel is sensed idle, then the station is allowed to transmit. If the channel is busy, the station defers its transmission. Once the channel is clear, a station sends a short signal telling all other stations not to transmit, and then sends its packet. In Ethernet 802.11, the station continues to wait for a random amount of time (to reduce the probability of collision), and checks to see if the channel is still free. If it is free, the station transmits, and waits for an acknowledgment signal that the packet was received. CSMA/CA is used where collision detection cannot be implemented due to the nature of the channel. CSMA/CA is typically used in 802.11 based wireless local area networks (LAN's); because, it is not possible to listen to the channel while sending. Therefore, collision detection is not possible. Another reason is the hidden terminal problem, where node A, in range of the receiver R, is not in range of another node B, and therefore cannot know if B is transmitting to R.

In Asynchronous Transfer Mode (ATM) systems, a fixed-size data cell is transmitted in a channel-specific time period of fixed duration during which a unit of communication occurs between two fixed terminals without conflict. The motivation for the use of small data cells in ATM networks was the reduction of jitter (delay variance, in this case) in the multiplexing of data streams. The reduction of jitter (and also end-to-end round-trip delays) is particularly important when carrying voice traffic. Again however, the cell definition and communication in ATM is fixed and non-adaptable.

U.S. Pat. No. 5,896,412 describes a method of wireless communication among a plurality of stations in which each station communicates with all of the other stations over a cycle time divided into a plurality of communication sectors during each of which one of the stations transmits, including the step of changing the frequency of the transmission in accordance with a predetermined protocol, only at the end of a sector in which one of the stations transmits. Preferably, the frequency of transmission is reset to a given frequency in accordance with the protocol when none of the stations transmit over a predetermined period.

U.S. Patent Application No. 20060029061 describes a packet communication network, in which packet switched transport is provided among intelligent nodes wherein the duty cycling of the intelligent nodes is minimized in order to maximize power life using a synchronization algorithm that assures all nodes are able to propagate information through the network without undue use of transmission and reception power. Frequency hopping time-division multiple access supports packet communication between intelligent nodes via assigned directed links, each link being assigned to a time-channel offset (cell) in a superframe, so that a link carrying a packet string between any two intelligent nodes is active only during its assigned time slot.

Thus, an apparatus and method for adaptive data packet scheduling in a mesh network are needed.

DETAILED DESCRIPTION

In the following detailed description, reference is made to the accompanying drawings that form a part hereof, and in which are shown, by way of illustration, specific embodiments in which the disclosed subject matter can be practiced. It is understood that other embodiments may be utilized and structural changes may be made without departing from the scope of the disclosed subject matter.

According to various example embodiments of the disclosed subject matter as described herein, there is provided an apparatus and method for adaptive data packet scheduling in a mesh network. A particular embodiment relates to wireless data networks and more particularly to a multiple-hop wireless radio frequency mesh network adaptive data communications process employing a packet-switched time-sharing communications protocol. The particular embodiment has application to data collection from an array of sensors disposed in a network topology wherein at least two intelligent communication nodes are within reliable radio communication range within an array of peer communication nodes. The particular embodiment of an example system and method described herein presents an adaptive approach for scheduling operations of the wireless data network radios in a wireless sensor node so that power consumption, latency, and throughput can be optimized. The network and node configuration in a particular embodiment are described in more detail below.

Figure 1:
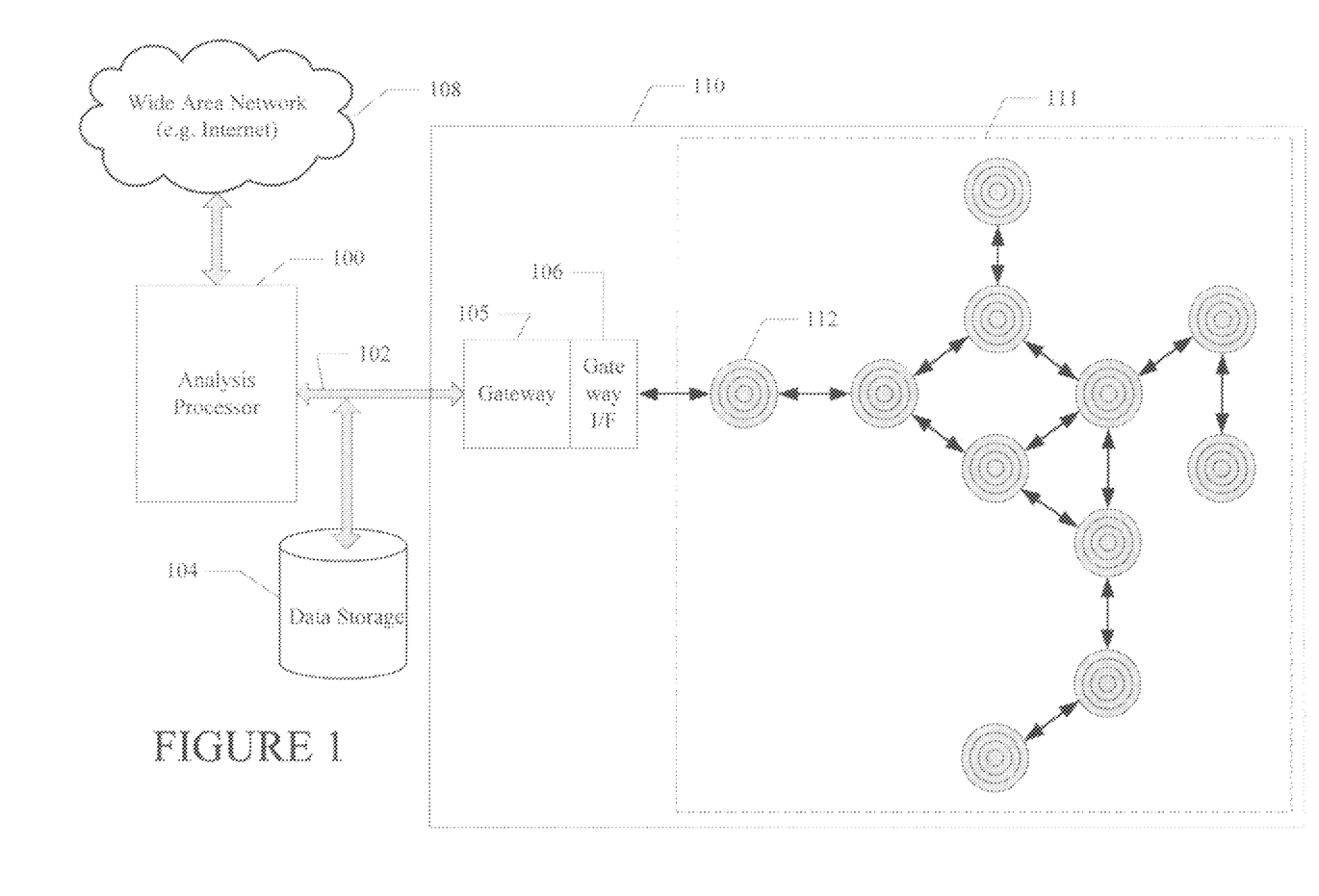
FIG. 1 illustrates a mesh network environment in which various embodiments can operate.

FIG. 1 illustrates a network environment of an example embodiment including a mesh network 110 of wireless sensors 112. Each of the sensors can be implemented as the combination of components illustrated in FIG. 2 and described in more detail below. Wireless sensor network (WSN) 110 includes a set of wireless sensors 112 (nodes), each in data communication with others of its proximate neighbor nodes. The nodes 112 can communicate using established data communication protocols, typically at the Media Access Control (MAC) Layer. The MAC Layer is one of two sub-layers that make up the Data Link Layer of the well-known OSI networking model. The MAC layer is responsible for moving data packets to and from the network interface of one node to another node across a shared channel. A node can be any vertex or intersection in the communication network 110. A node may be passive or intelligent. In a particular embodiment, a node is assumed to be an intelligent node capable of receiving and analyzing information, taking certain actions as a result of received information, including the storing of received or processed information, modifying at least part of received information, and in some instances originating and retransmitting information. The details of a node of a particular embodiment are detailed in FIG. 2.

Referring still to FIG. 1, data packets or messages can be directed between any two nodes of the WSN 110 as each node 112 has a unique identifier. A data packet or message is a self-contained unit of transmitted information. Typically, a data packet has a header, a payload, and an optional trailer. A link is a path which originates at one node and terminates at one other node. A link or path between nodes may include multiple hops between a plurality of intermediate nodes prior to reaching a destination node. The transfer of messages between two nodes of WSN 110 in a unicast or broadcast transmission is termed a local communication.

Each of the nodes 112 of WSN 110 can also communicate with a gateway 105 via a gateway interface 106. The gateway 105 provides a connection between the WSN 110 and an analysis processor 100. In an alternative embodiment, gateway 105 and gateway interface 106 can be located outside of the WSN 111. Gateway 105 can be implemented as any node of WSN 110. It will be apparent to those of ordinary skill in the art that in the description herein, variations of the WSN are still within the scope of the appended claims. Analysis processor 100 can be used to receive sensor data from any of the nodes 112 of WSN 110 via gateway 105 and to analyze the sensor data for aggregated environmental monitoring and control. Gateway 105 and analysis processor 100 can use a conventional data storage device 104 for data storage and retrieval. Analysis processor 100 can also include a connection to a wide area network 108, such as the Internet. In this manner, the gateway 105 and the WSN 110 can obtain access to the Internet.

Gateway 105 can also provide synchronization timing for the nodes 112 of WSN 110. Gateway 103 can send periodic messages to each of the nodes 112 of WSN 110. These periodic messages can include a timing signal to which each of the nodes 112 can synchronize their internal timers. Similarly, messages from gateway 105 to each of the nodes 112 can be used to provide system status, configuration, and control settings for the nodes of WSN 110. The transfer of messages between the gateway 105 and each of the nodes 112 or between a node 112 and all other nodes of WSN 110 in a broadcast or multicast transmission is termed a global communication. According to a particular embodiment, communication between nodes 112 and/or between nodes 112 and gateway 103 occurs only at specific times and on specific channels for local and global data communications.

The WSN 110 can be configured in any of a variety of ways. Nodes 112 can be added, removed, or moved within the array of nodes of WSN 110. Each of the nodes 112 include functionality to join or reconfigure themselves in the WSN 110 when a node is added or moved. As part of this functionality, each node 112 can discover its neighbor nodes and automatically negotiate and establish communication paths with those neighbors. A node can be in data communication with neighbors that are within the radio reception range of the node. Depending on the strength of the wireless transceivers (e.g. radios) within each node 112, the distance between neighbor nodes is variable. Given that in some applications the environment in which WSN 110 is being used may be subject to radio interference, it is possible that the wireless data communications between nodes may be disrupted. In these cases, each node can sense the loss of data communications with a neighbor and may reconfigure itself to use alternate data paths through other functioning nodes of WSN 110. As such, the WSN 110 is highly adaptable to changing conditions in the environment and in the configuration of the wireless network.

Figure 2:
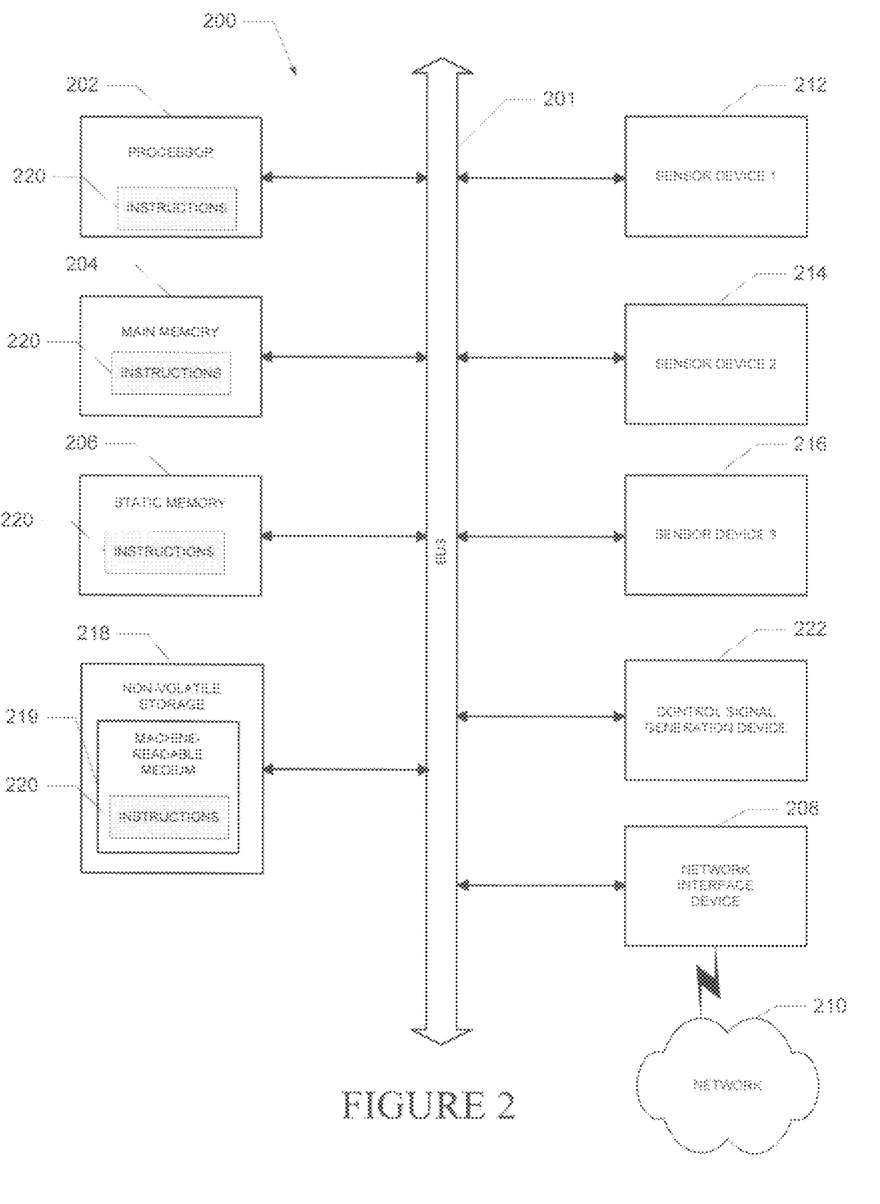
FIG. 2 illustrates an example embodiment of a node that can operate in a mesh network.

FIG. 2 shows a diagrammatic representation of a machine in the example form of a network node or sensor unit 200 within which a set of instructions, for causing the node to perform any one or more of the methodologies discussed herein, may be executed. In alternative embodiments, the node operates as a standalone device or may be connected (e.g., networked) to other machines. In a networked deployment, the node may operate in the capacity of a server or a client machine in client-server network environment, or as a peer machine in a peer-to-peer (or distributed) network environment, such as a mesh network. The node may be a computer, an intelligent sensor, a logic device, an application specific integrated circuit (ASIC), a field programmable gate array (FPGA), a process logic controller (PLC), a hard-wired module, a network router, gateway, switch or bridge, or any machine capable of executing a set of instructions (sequential or otherwise) that specify actions to be taken by that machine. Further, while a single machine is illustrated in FIG. 2, the term "machine" or "node" shall also be taken to include any collection of machines that individually or jointly execute a set (or multiple sets) of instructions to perform any one or more of the methodologies discussed herein.

The example node 200 includes a processor 202 (e.g., a central processing unit (CPU)), a main memory 204 and optionally a static memory 206, which communicate with each other via a bus 201. The node 200 may further include one or more sensor devices 212, 214, and 216. These sensor devices can include temperature sensors, humidity sensors, air flow sensors, and/or other types of sensors for detecting and measuring a desired condition. The sensor devices 212, 214, and 216 can also include security devices, such as motion detectors, acoustical detectors, seismic detectors, vibration detectors, metal detectors, magnetic anomaly detectors, explosives detection, and the like. Additionally, sensor devices 212, 214, and 216 can also include process control devices, such as conveyor motion activation and status, robotic system activation and status, machine system activation and status, and the like. In general, sensor devices 212, 214, and 216 can include any sensors for detecting and measuring a desired condition within an environmental management system, process control system, building management system, or the like.

The node 200 may further include a non-volatile memory 218, a control signal generation device 222, and a network interface device 208 (e.g. a radio transceiver). The non-volatile memory 218 includes a machine-readable medium 219 in which is stored one or more sets of instructions (e.g., software 220) embodying any one or more of the methodologies or functions described herein. The instructions 220 may also reside, completely or partially, within the main memory 204, the static memory 206, and/or within the processor 202 during execution thereof by the node 200. The main memory 204, static memory 206, and the processor 202 also may constitute machine-readable media. The software, instructions, and/or related data 220 may further be transmitted or received over a network 210 via the network interface device 208. The network interface device 208, in a wireless node configuration of one embodiment, may include a radio transceiver for sending and receiving data to/from network 210 using a wireless data transfer protocol, such as the family of 802.11 standards from IEEE. In this manner, node 200 can perform wireless data communications with other nodes of WSN 110. The control signal generation device 222 can be used to control the operation of any system external to the WSN 110, such as an environmental management system, process control system, building management system or other device or system that can alter the conditions being monitored by sensors 212, 214, and 216.

Typically in wireless network systems, the wireless data transceivers (e.g. radios) in the network nodes consume the most electrical power and represent the largest drain on the node's battery power. As such, the radio should be turned off for most of the time to increase the battery lifetime of the nodes. In an example embodiment, all nodes of WSN 110 are time synchronized. Each node wakes up for a short period of time for radio communication with other nodes or the gateway. Then, the node's radio is shut off and the node sleeps until the next scheduled communication cycle.

In conventional wireless network systems, a cycle time is divided into a fixed plurality of communication time slots, during each of which one of the nodes transmits. During normal operations of the WSN 110, each slot becomes active sequentially in a round-robin fashion during the cycle time. Only one node can send data in a given slot. If multiple nodes have a packet to send, the nodes compete for the slot using a Carrier Sense Multiple Access (CSMA) protocol. This well-known scheme is fairly inefficient and does not scale to large number of nodes. As the number of packets being communicated in the network increases, the network becomes unreliable; because, there is a high probability that the packets collide (i.e. packets get transmitted on the same channel at the same time by more than one node causing the data communication to become garbled and unusable). As packets collide, there are more retransmissions, causing even more collisions. One simple solution is to increase the number of slots in the cycle. However, this solution causes the nodes to wake up more often causing the nodes to consume more power.

As described herein, an adaptive low power method and apparatus is described for reducing the number of wasted time slots and radio traffic interferences. At the same time, the disclosed method adapts the slotting allocations to congestion in the network. In particular embodiments as described in more detail below, the adaptive low power method and apparatus includes the following features:

- Adaptive data communication scheduling in a wireless sensor network,
- Techniques for allocating slots to nodes for data communication,
- Techniques for communicating node assignments to other nodes,
- Techniques for identifying and predicting traffic congestion, and
- Techniques for adapting slot assignments to predicted traffic congestion.

Figure 3:
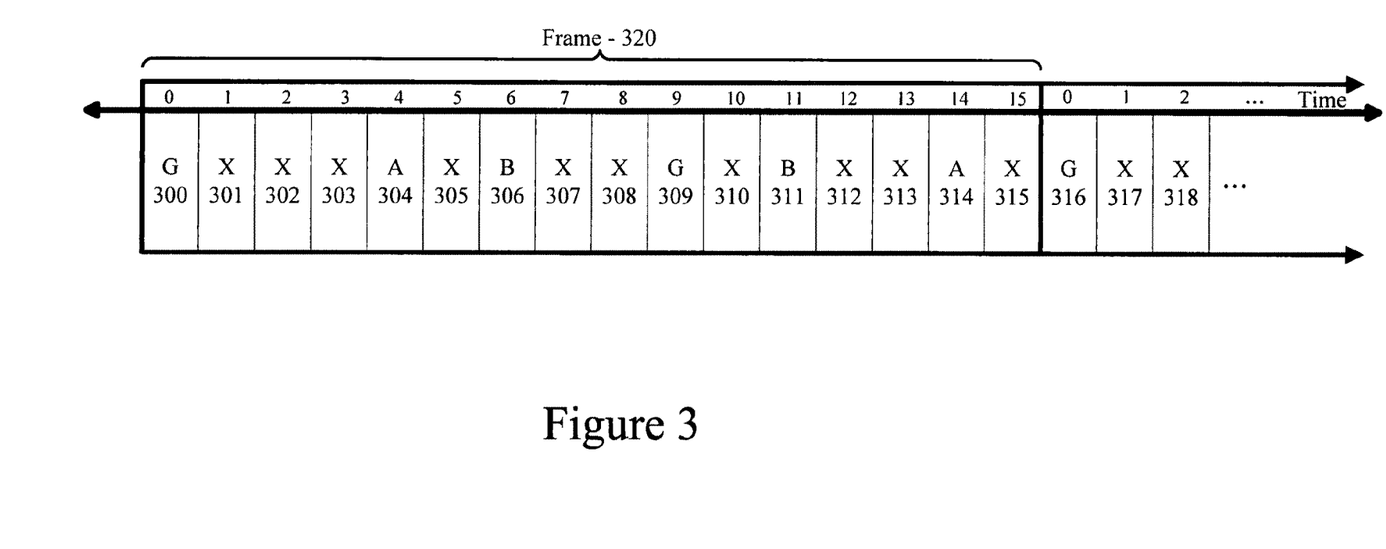
FIG. 3 illustrates a frame and a plurality of component slots in a particular embodiment.

In a particular embodiment, global time is represented as a time period divided into a plurality of frames. Each frame is further subdivided into a plurality of slots. Each of the plurality of slots provides a time segment for local data communication between nodes in a mesh network. The network nodes use the slots to synchronize and send messages to other nodes. FIG. 3 illustrates a frame 320 and a plurality of component slots 300-315. In the particular embodiment shown, the frame 320 is divided into 16 slots; however, other embodiments can use an arbitrary number of slots per frame. It will be understood by those of ordinary skill in the art that the size of the time frame, the number of slots within a frame, and the distribution of slots within the frame can all be variable and still fall within the scope of the claims herein. A node 112 in WSN 110 can select and dynamically assign to itself one or more slots 300-315 of frame 320 in which the node can receive messages from other nodes or the gateway 105. In a particular embodiment, a node 112 can randomly select one or more slots 300-315 of frame 320 using a randomizer. Other techniques for slot assignment are also described herein. Once a node has assigned itself a number of slots, the node communicates its slot assignments to other nodes in the mesh network in a slot assignment advertisement message. As nodes detect changes in the network traffic in the mesh network, each node can increase or decrease the number of slots the node has assigned to itself to adapt to changing network traffic requirements and conditions.

As described in more detail below, the adaptive scheduling system and method of a particular embodiment is described in terms of the four phases mentioned above: (1) slot assignment, (2) advertisement, (3) communication, and (4) slot adaptation. Each of these phases is described in more detail below in connection with a particular example embodiment.

Slot Assignment

Referring again to FIG. 3, an initial process includes dividing global time into frames 320, typically of equal sizes. Each frame 320 is further sub-divided into a plurality of slots 300-315, which are used for global and local communication. In a particular embodiment, one or more of slots 300-315 can be defined as global slots, which are used for global communication messages that are destined for all nodes or multiple nodes in the network. Examples of global communications include time synchronization messages (e.g. beacons), control commands, and other network management messages. Global communication slots are deterministically selected. The gateway 105 can be the master of managing the global communication slots and responsible for choosing those slots. However, in an alternative embodiment, one or more nodes of WSN 110 can assign the global communication slots with agreements. As shown in FIG. 3, the assigned global slots in an example embodiment are slot 300 and slot 309 of frame 320. Each global slot is tagged for purposes of illustration in FIG. 3 with the letter "G". As also shown in FIG. 3, the currently unassigned (available) slots in the example embodiment are slots 301-303, 305, 307-308, 310, 312-313, and 315 of frame 320. Each unassigned slot is tagged for purposes of illustration in FIG. 3 with the letter "X". When the network 110 and its component nodes 112 are first initialized, the slot assignments for frame 320 can all be initialized to unassigned (available). The slot assignments are retained by each node in a data structure resident in or available to each node. As slot assignments are made, this data structure is updated using the advertisement process described below to reflect the current slot assignment status for all nodes in the network. Thus, at any moment, any node can determine which of slots 300-315 are unassigned and to which nodes in the one hop neighborhood others of the slots are assigned.

In the example embodiment shown in FIG. 3, two nodes on WSN 5110 have found unassigned time slots and have already assigned themselves slots in frame 320. In particular, node A has dynamically assigned to itself slots 304 and 314. These assigned slots can be used by node A for receiving data from other nodes in a local communication. The slots assigned to node A are tagged for purposes of illustration with the letter "A" as shown in FIG. 3. Node B has dynamically assigned to itself slots 306 and 311. These assigned slots can be used by node B for receiving data from other nodes in a local communication. The slots assigned to node B are tagged for purposes of illustration with the letter "B" as shown in FIG. 3. It will be apparent to those of ordinary skill in that art that nodes A and B could each have assigned themselves a fewer or greater number of unassigned slots of frame 320. By assigning more slots to itself, a node increases the bandwidth (i.e. data transfer capacity) the node has for data communication on the WSN 110. However, a greater number of slot allocations also increases the node's power consumption rate for such data communications. Thus, each node has an incentive to assign only a quantity of slots to itself that are necessary to accommodate the specific data communication requirements for the particular node. Because the gateway 105 is powered most of time, every slot is assigned. Also, the same slot may be assigned to multiple nodes in which case they both can receive data.

In a particular embodiment, each node can randomly select one or more specific time slots for itself using a randomizer. In a random selection process, a particular node is equally likely to select any one of the unassigned slots in frame 320. In an alternative embodiment, each node can select one or more specific time slots for itself using a deterministic selection. In another alternative embodiment, each node can select one or more specific time slots for itself using weighted selection process that biases a particular node's slot selection based on the particular nodes position in the mesh network. In this manner, nodes that are neighbors on a data path may select slots in a staggered position in the frame 320 to increase the efficiency of the resulting pipelined data communications over the data path. Other alternative embodiments for a slot selection process will become apparent to those of ordinary skill in the art upon reading the disclosure herein.

Slot Assignment Advertisement

Once nodes have assigned one or more time slots to themselves, the nodes advertise their slot assignment information to their neighbor nodes in a slot assignment advertisement message. The slot assignment advertisement message can carry a unique message identifier or the slot assignment information can be appended to a general system status/configuration message. The slot assignment information received from a neighbor node is retained by each node in the slot assignment data structure described above. This slot assignment data structure can be retained as an updated copy resident in each node or maintained centrally and made accessible to each node. The nodes in the WSN 110 can collect slot assignment information from neighbor nodes that are one-hop away and, in other cases, from neighbor nodes that are multiple hops distant. In this manner, slot assignment information is propagated around the network as a node makes or changes a slot assignment. Each node uses the current slot assignment information to create a local schedule for the data that the node can transfer. Once the node has assigned one or more slots to itself and propagated the slot assignment(s) to the other nodes in the network, the node making the slot assignment may then begin to listen for a local data communications being sent to the node during its assigned time slot(s). Additionally, the node may listen for a global data communication being sent to the node during the assigned global time slot(s). In an alternative embodiment, other nodes of the mesh network can query a node for its slot assignment information.

Communication

In a particular embodiment, there are several forms of communication in WSN 110. In a first form of data communication in WSN 110, a node 112 or the gateway 105 can broadcast or multicast data packets in a global communication to all devices or multiple devices in network 110. In a second form of data communication in WSN 110, a node 112 or the gateway 105 can unicast data packets in a local data communication to a specific device in network 110. These forms of communication in WSN 110 are described in more detail below.

When a node of WSN 110 or the gateway 105 wants to send data in a broadcast or multicast to all nodes or other multiple destination nodes in a global data communication, the sender node checks the slot assignment information data structure to determine which slots have been assigned for global communication. Referring again to FIG. 3, the slots assigned for global communication in the illustrated example embodiment are slots 300 and 309 of frame 320. The sender node can then sleep (e.g. transition to a low power idle mode with the data communication radio deactivated) until the next global slot becomes active. When the next global slot becomes active, the sender node can wake up and begin the global data communication to all nodes or other multiple destination nodes as the sender node can be assured that all nodes will be awake on the global slot and ready to receive the global data communication from the sender node. When a node wants to broadcast or multicast a message, the sender node can only send the broadcast or multicast message at global slots.

When a node of WSN 110 or the gateway 105 wants to send data in a unicast data transmission to another specific individual destination node in a local data communication, the sender node checks the slot assignment information data structure to determine which slots have been assigned to the specific destination node. Referring again to FIG. 3, if node A is the destination node, the sender node determines that the slots assigned to node A for local communication in the illustrated example embodiment are slots 304 and 314 of frame 320. The sender node can then sleep until the next slot assigned to the destination node becomes active. When the destination node's slot becomes active, the sender node can wake up and begin the local data communication to the destination node as the sender node can be assured that the destination node will be awake on its assigned slot and ready to receive the local data communication from the sender node. The sender node can also use opportunistic scheduling for sending local data to a destination node. In cases when the broadcasting (i.e. global) slots are available and may become active sooner than a slot assigned to the specific destination node, a sender node may choose to use a broadcast slot (i.e. global slot) to send the local information to the specific destination node. Information in the header of the data packet can be used to determine the identity of the intended destination node and whether the data packet is a local or a global data communication.

Some node of WSN 110 may assign the same slots, and they may receive data packets at the slot. Senders compete for the slot in the manner of Carrier Sense Multiple Access(CSMA). Before they send a data packet, they wait for a random amount time and send the data packet if the channel is clear.

Slot Adaptation

In the normal operating conditions, all devices on the network wake up on the global slot(s). Each individual network device also wakes up on its assigned slot(s) for local data communications. In situations when the network conditions (e.g. network traffic load, network throughput, network error or retransmission rates, and the like) change, devices on the network can adapt to the current or anticipated network conditions by increasing or decreasing the number of slots assigned to a specific network device. A node can detect the current or anticipated network conditions by monitoring the number of slots assigned to the node that are unused over a monitored period of time or over a monitored number of frames. For example, a node may determine that although the node has been waking up and listening for incoming local data on the node's specific assigned slots, the node has not received any local data communication for the last n frames. In this case, the node may conclude that it has over-allocated itself with slots for local communications. Because of this over-allocation of slots, the node may be wasting battery reserves by needlessly waking up too often. The node can compensate for this situation by de-assigning one or more of its assigned slots and advertising the de-assignment to the other network devices. By de-assigning one or more of its assigned slots, the node changes a slot assignment back to an unassigned status. As a result, the node will wake up less often and thereby reduce its energy consumption and extend its battery life.

In other situations, for example, a node may determine that each time the node has been waking up and listening for incoming local data on the node's specific assigned slots, the node has received a quantity of incoming local data for the last n frames that exceeds a pre-determined threshold. In this case, the node may conclude that it has under-allocated itself with slots for local communications. Because of this under-allocation of slots, the node may be causing network delays; because the node is unable to consume the incoming local data at a fast enough rate. The node can adapt to this situation by assigning one or more additional slots to itself and advertising the new slot assignment(s) to the other network devices. As a result, the node will wake up more often and thereby increase the rate at which it can receive data from the network.

In a similar manner, the number of slots assigned for global communications can be dynamically increased or decreased based on the quantity of global data that needs to be broadcast or multicast to the network devices. In this manner, each network device can detect network traffic conditions and adapt to the current or anticipated conditions by changing the device's slot allocations based on the detected network traffic conditions.

Figure 4:
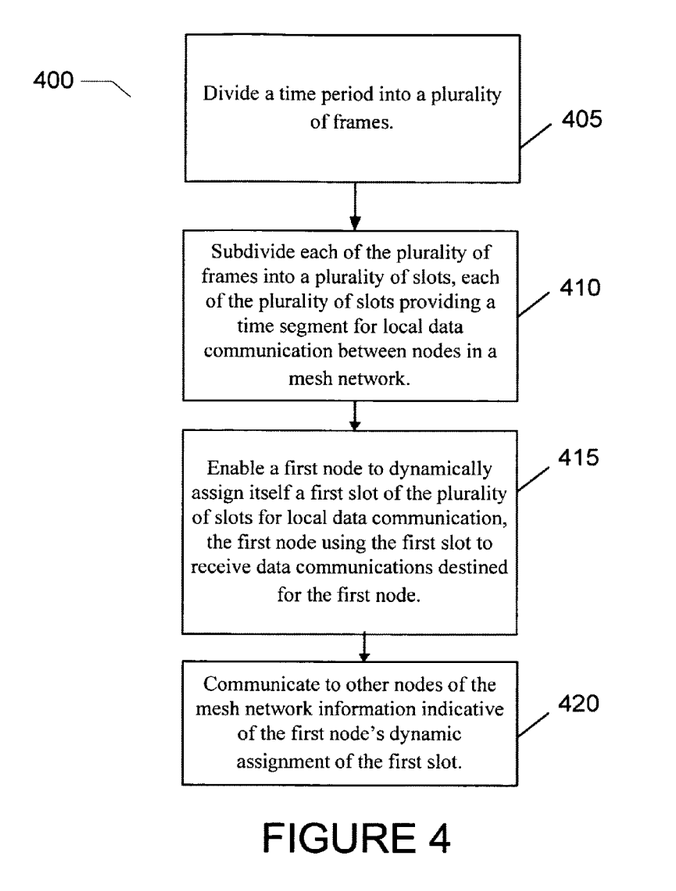
FIG. 4 is a flow diagram illustrating the processing flow for a particular example embodiment.

FIG. 4 is a flow diagram illustrating the basic processing flow 400 for a particular embodiment. As shown, an example embodiment is configured to divide a time period into a plurality of frames (processing block 405); subdivide each of the plurality of frames into a plurality of slots, each of the plurality of slots providing a time segment for local data communication between nodes in a mesh network (processing block 410); enable a first node to dynamically assign itself a first slot of the plurality of slots for local data communication, the first node using the first slot to receive data communications destined for the first node (processing block 415); and communicate to other nodes of the mesh network information indicative of the first node's dynamic assignment of the first slot (processing block 420).In a particular embodiment, the network node includes a communication scheduler to divide a time period into a plurality of frames, the communication scheduler further to subdivide each of the plurality of frames into a plurality of slots, each of the plurality of slots providing a time segment for local data communication between the network node and other nodes in a mesh network, the communication scheduler further to enable the network node to dynamically assign itself a first slot of the plurality of slots for local data communication, the network node using the first slot to receive data communications destined for the network node; and a network interface to communicate to other nodes of the mesh network information indicative of the network node's dynamic assignment of the first slot.

In a particular embodiment, the sensor network includes a gateway to divide a time period into a plurality of frames, the gateway further to subdivide each of the plurality of frames into a plurality of slots, each of the plurality of slots providing a time segment for local data communication between the gateway and other sensors in the sensor network; and a sensor in wireless data communications with the gateway, the sensor being configured to dynamically assign itself a first slot of the plurality of slots for local data communication, the sensor using the first slot to receive data communications destined for the sensor, the sensor being further configured to wirelessly communicate to other sensors of the sensor network information indicative of the sensor's dynamic assignment of the first slot.

Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In example embodiments, a node configured by an application may constitute a "module" that is configured and operates to perform certain operations as described herein. In other embodiments, the "module" may be implemented mechanically or electronically. For example, a module may comprise dedicated circuitry or logic that is permanently configured (e.g., within a special-purpose processor) to perform certain operations. A module may also comprise programmable logic or circuitry (e.g., as encompassed within a general-purpose processor or other programmable processor) that is temporarily configured by software to perform certain operations. It will be appreciated that the decision to implement a module mechanically, in the dedicated and permanently configured circuitry, or in temporarily configured circuitry (e.g. configured by software) may be driven by cost and time considerations. Accordingly, the term "module" should be understood to encompass a functional entity, be that an entity that is physically constructed, permanently configured (e.g., hardwired) or temporarily configured (e.g., programmed) to operate in a certain manner and/or to perform certain operations described herein.

While the machine-readable medium 219 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies described herein. The term "machine-readable medium" shall accordingly be taken to include, but not be limited to, solid-state memories, optical and magnetic media, and carrier wave signals.

As noted, the software and/or related data may be transmitted over a network using a transmission medium. The term "transmission medium" shall be taken to include any medium that is capable of storing, encoding or carrying instructions for transmission to and execution by the machine, and includes digital or analog communication signals or other intangible media to facilitate transmission and communication of such software and/or data.

The illustrations of embodiments described herein are intended to provide a general understanding of the structure of various embodiments, and they are not intended to serve as a complete description of all the elements and features of components and systems that might make use of the structures described herein. Many other embodiments will be apparent to those of ordinary skill in the art upon reviewing the description provided herein. Other embodiments may be utilized and derived, such that structural and logical substitutions and changes may be made without departing from the scope of this disclosure. The figures herein are merely representational and may not be drawn to scale. Certain proportions thereof may be exaggerated, while others may be minimized. Accordingly, the specification and drawings are to be regarded in an illustrative rather than a restrictive sense.

The description herein may include terms, such as "up", "down", "upper", "lower", "first", "second", etc. that are used for descriptive purposes only and are not to be construed as limiting. The elements, materials, geometries, dimensions, and sequence of operations may all be varied to suit particular applications. Parts of some embodiments may be included in, or substituted for, those of other embodiments. While the foregoing examples of dimensions and ranges are considered typical, the various embodiments are not limited to such dimensions or ranges.

The Abstract is provided to comply with 37 C.F.R. §1.74(b) to allow the reader to quickly ascertain the nature and gist of the technical disclosure. The Abstract is submitted with the understanding that it will not be used to interpret or limit the scope or meaning of the claims.

In the foregoing Detailed Description, various features are grouped together in a single embodiment for the purpose of streamlining the disclosure. This method of disclosure is not to be interpreted as reflecting an intention that the claimed embodiments have more features than are expressly recited in each claim. Thus the following claims are hereby incorporated into the Detailed Description, with each claim standing on its own as a separate embodiment.

Thus, as described above, an apparatus and method for adaptive data packet scheduling in a mesh network is disclosed. Although the disclosed subject matter has been described with reference to several example embodiments, it may be understood that the words that have been used are words of description and illustration, rather than words of limitation. Changes may be made within the purview of the appended claims, as presently stated and as amended, without departing from the scope and spirit of the disclosed subject matter in all its aspects. Although the disclosed subject matter has been described with reference to particular means, materials, and embodiments, the disclosed subject matter is not intended to be limited to the particulars disclosed; rather, the subject matter extends to all functionally equivalent structures, methods, and uses such as are within the scope of the appended claims.

We claim:

1. A method comprising:
    dividing a time period into a plurality of frames;
    subdividing each of the plurality of frames into a plurality of slots, the plurality of slots providing time segments for data communication between nodes in a mesh network, the plurality of slots including at least one global slot for multicast data communication between nodes in the mesh network, the data communication in any of the plurality of slots by a first node being performed using a same single radio transceiver of the first node, the single radio transceiver of the first node being deactivated when the first node is not communicating on the mesh network;
    enabling the first node to dynamically assign itself two or more slots of the plurality of slots for data communication, the first node using the two or more slots to receive data communications destined for the first node; and communicating in the global slot to other nodes of the mesh network information indicative of the first node's dynamic assignment of the two or more slots, the first node communicating in the global slot using the same single radio transceiver of the first node.

2. The method as claimed in claim 1 wherein the first node dynamically assigns itself the two or more slots using a randomizer.

3. The method as claimed in claim 1 including detecting network traffic conditions and wherein the first node assigns itself additional slots based on the detected network traffic conditions.

4. The method as claimed in claim 1 including detecting network traffic conditions and wherein the first node de-assigns an assigned slot based on the detected network traffic conditions.

5. The method as claimed in claim 1 wherein the first node advertises slot assignment information to other nodes of the mesh network.

6. The method as claimed in claim 1 wherein other nodes of the mesh network query the first node for its slot assignment information.

7. The method as claimed in claim 1 wherein a node of the mesh network sends a local data communication to the first node only during a time segment corresponding to the two or more slots.

8. The method as claimed in claim 1 wherein the mesh network is a wireless sensor network.

9. The method as claimed in claim 1 wherein the mesh network includes a gateway device.

10. A network node comprising:
a communication scheduler to divide a time period into a plurality of frames, the communication scheduler further to subdivide each of the plurality of frames into a plurality of slots, the plurality of slots providing time segments for data communication between the network node and other nodes in a mesh network, the plurality of slots including at least one global slot for multicast data communication between nodes in the mesh network, the data communication in any of the plurality of slots by the network node being performed using a same single radio transceiver of the network node, the single radio transceiver of the network node being deactivated when the network node is not communicating on the mesh network, the communication scheduler further to enable the network node to dynamically assign itself two or more slots of the plurality of slots for data communication, the network node using the two or more slots to receive data communications destined for the network node; and
a network interface to communicate in the global slot to other nodes of the mesh network information indicative of the network node's dynamic assignment of the two or more slots, the network node communicating in the global slot using the same single radio transceiver of the network node.

11. The network node as claimed in claim 10 wherein the communication scheduler being further configured to dynamically assign for the network node the two or more slots using a randomizer.

12. The network node as claimed in claim 10 wherein the communication scheduler being further configured to detect network traffic conditions and wherein the network node assigns itself additional slots based on the detected network traffic conditions.

13. The network node as claimed in claim 10 wherein the communication scheduler being further configured to detect network traffic conditions and wherein the network node de-assigns an assigned slot based on the detected network traffic conditions.

14. The network node as claimed in claim 10 wherein the network interface being further configured to advertise slot assignment information to other nodes of the mesh network.

15. The network node as claimed in claim 10 wherein the network interface being further configured to receive a query from other nodes of the mesh network, the query including a request for the slot assignment information for the network node.

16. The network node as claimed in claim 10 wherein the network interface being further configured to receive a local data communication destined for the network node from other nodes of the mesh network only during a time segment corresponding to the two or more slots.

17. The network node as claimed in claim 10 wherein the mesh network is a wireless sensor network.

18. The network node as claimed in claim 10 wherein the mesh network includes a gateway device.

19. A sensor network comprising:
a gateway to divide a time period into a plurality of frames, the gateway further to subdivide each of the plurality of frames into a plurality of slots, the plurality of slots providing time segments for data communication between the gateway and other sensors in the sensor network; and
a sensor in wireless data communications with the gateway, the plurality of slots including at least one global slot for multicast data communication between nodes in the sensor network, the data communication in any of the plurality of slots by the sensor being performed using a same single radio transceiver of the sensor, the single radio transceiver of the sensor being deactivated when the sensor is not communicating on the sensor network, the sensor being configured to dynamically assign itself two or more slots of the plurality of slots for data communication, the sensor using the two or more slots to receive data communications destined for the sensor, the sensor being further configured to wirelessly communicate in the global slot to other sensors of the sensor network information indicative of the sensor's dynamic assignment of the two or more slots, the sensor communicating in the global slot using the same single radio transceiver of the sensor.

20. The sensor network as claimed in claim 19 wherein the sensor being further configured to detect network traffic conditions and wherein the sensor dynamically assigns itself additional slots based on the detected network traffic conditions.

21. The sensor network as claimed in claim 19 wherein the sensor being further configured to detect network traffic conditions and wherein the sensor de-assigns an assigned slot based on the detected network traffic conditions.

22. An article of manufacture comprising a non-transitory machine-readable storage medium having machine executable instructions embedded thereon, which when executed by a machine, cause the machine to:
divide a time period into a plurality of frames;
subdivide each of the plurality of frames into a plurality of slots, the plurality of slots providing time segments for data communication between nodes in a mesh network, the plurality of slots including at least one global slot for multicast data communication between nodes in the mesh network, the data communication in any of the plurality of slots by a first node being performed using a same single radio transceiver of the first node, the single radio transceiver of the first node being deactivated when the first node is not communicating on the mesh network;

enable the first node to dynamically assign itself two or more slots of the plurality of slots for data communication, the first node using the two or more slots to receive data communications destined for the first node; and to communicate in the global slot to other nodes of the mesh network information indicative of the first node's dynamic assignment of the two or more slots, the first node communicating in the global slot using the same single radio transceiver of the first node.

* * * * *